United States Patent
Fischer et al.

[15] 3,690,485
[45] Sept. 12, 1972

[54] PORTABLE PLATFORMS, WITH ROLLER MEANS INSTALLED ON THEIR UPPER SIDE, FOR THE HANDLING AND TRANSPORTING OF FREIGHT

[72] Inventors: Hans Jurgen Fischer, Haibach; Georg Behrmann, Lauf, Pegnitz, both of Germany

[73] Assignee: Faun-Werke Kommunalfahrzeuge und Lastkraftwagen Karl Schmidt, Nurnberg, Germany

[22] Filed: Nov. 20, 1970

[21] Appl. No.: 91,415

[30] Foreign Application Priority Data

Nov. 21, 1969    Germany..........P 19 58 565.0

[52] U.S. Cl. ................214/310, 108/53, 108/56, 193/35 SS, 193/35 MD, 214/38 D, 214/84, 214/621
[51] Int. Cl...............................................B65g 67/02
[58] Field of Search............214/38 D, 84, 310, 621; 193/35 R, 35 SS, 35 MD; 108/56, 53

[56] References Cited

UNITED STATES PATENTS

| | | | |
|---|---|---|---|
| 2,789,708 | 4/1957 | Payne | 214/84 |
| 2,949,992 | 8/1960 | Weinberg | 214/84 X |
| 3,514,001 | 5/1970 | DeMerritt et al. | 214/84 X |
| 2,430,267 | 11/1947 | Arthur | 108/56 |
| 2,699,912 | 1/1955 | Cushman | 108/56 |
| 2,932,527 | 4/1960 | Payne | 214/84 X |
| 3,151,754 | 10/1964 | Kemp | 214/310 |

*Primary Examiner*—Robert G. Sheridan
*Attorney*—Holman & Stern

[57] ABSTRACT

A portable supporting platform particularly adapted for intermodal transporting and handling of containerized freight, in which there is an upper section upon which the freight is supported, and a lower section having roller means extending upwardly through openings in the upper section to rollingly support the freight when the upper and lower sections are in assembled relation. The upper section or both sections include attachments for conventional lifting and for securing means to permit transporting of such sections together with the freight as an integral unit.

13 Claims, 16 Drawing Figures

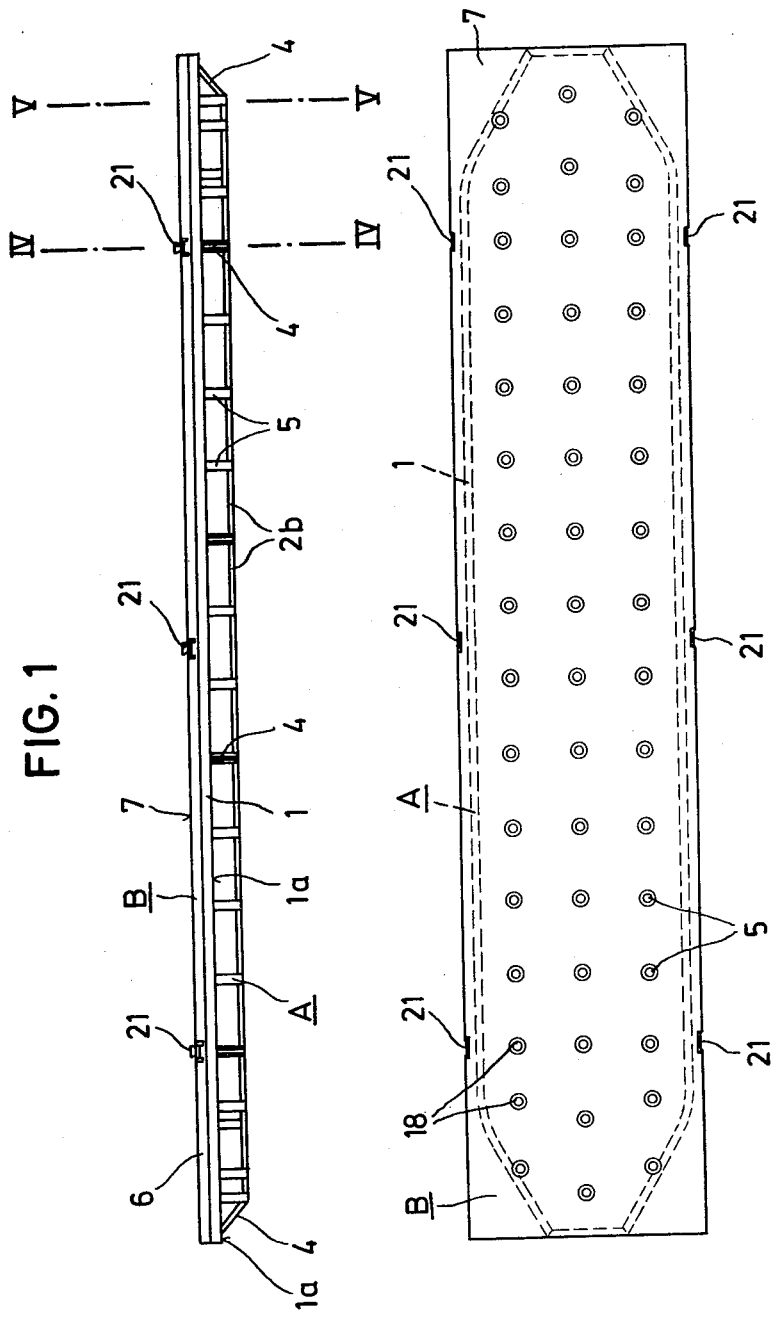

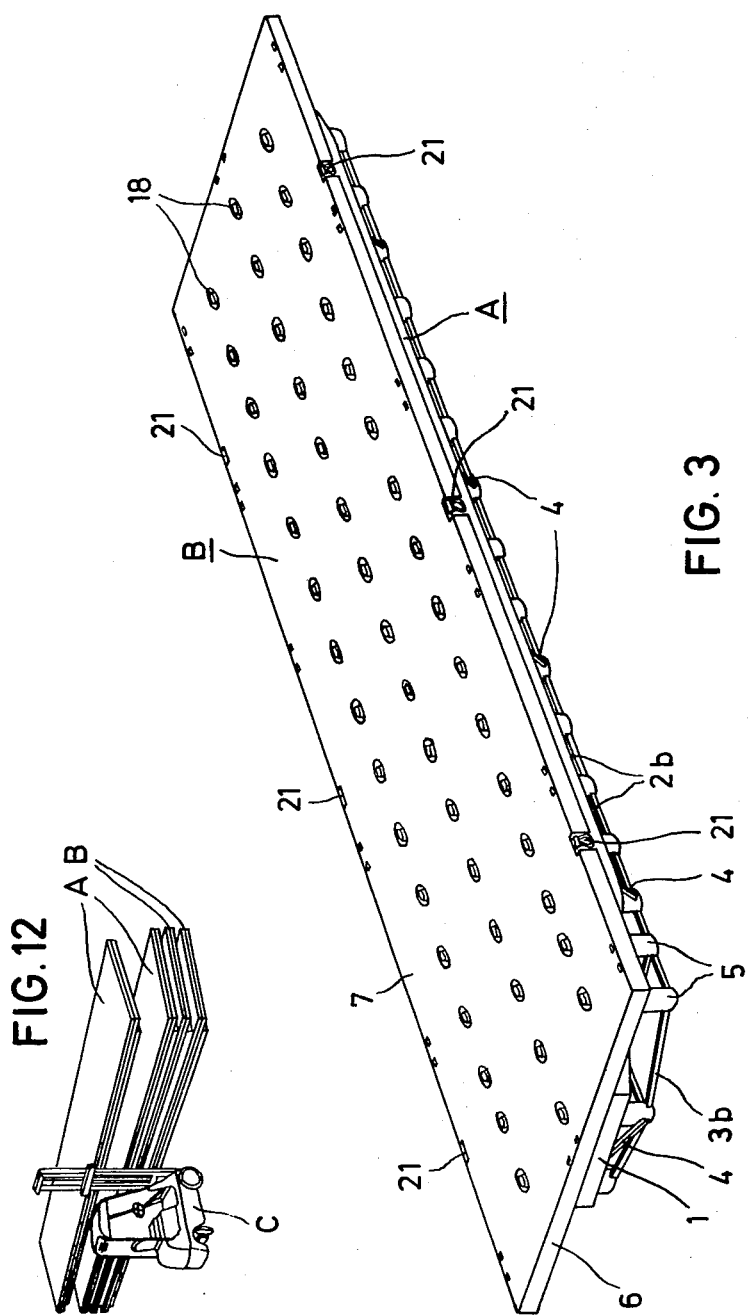

FIG. 4
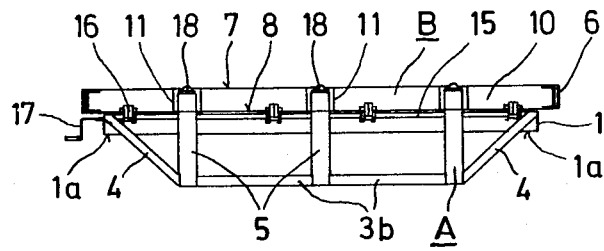
FIG.5
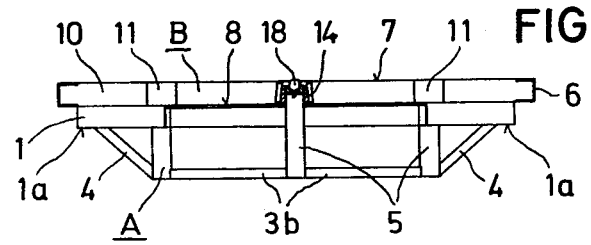
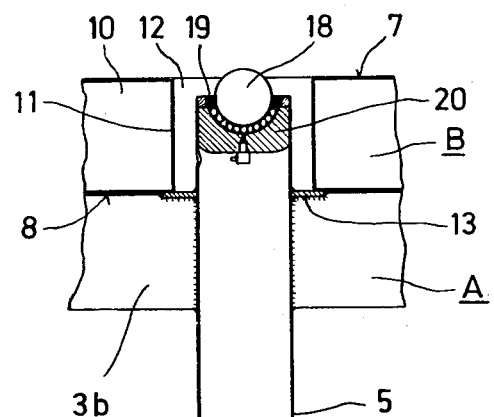
FIG.6

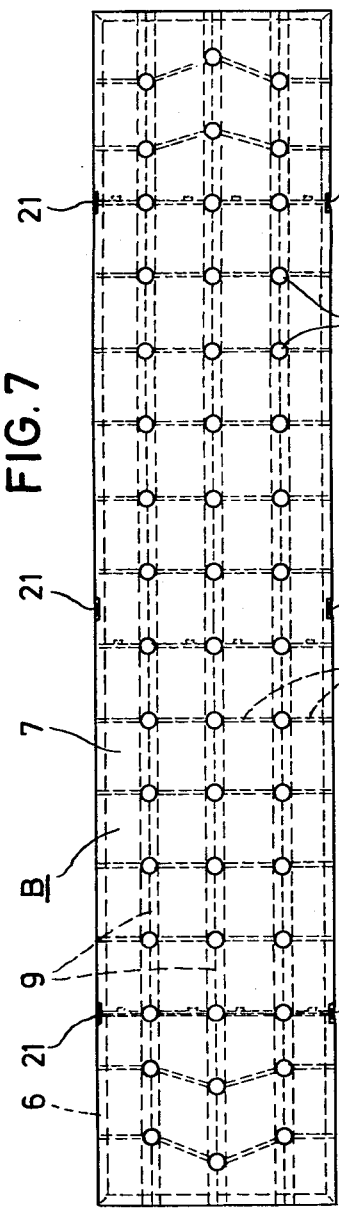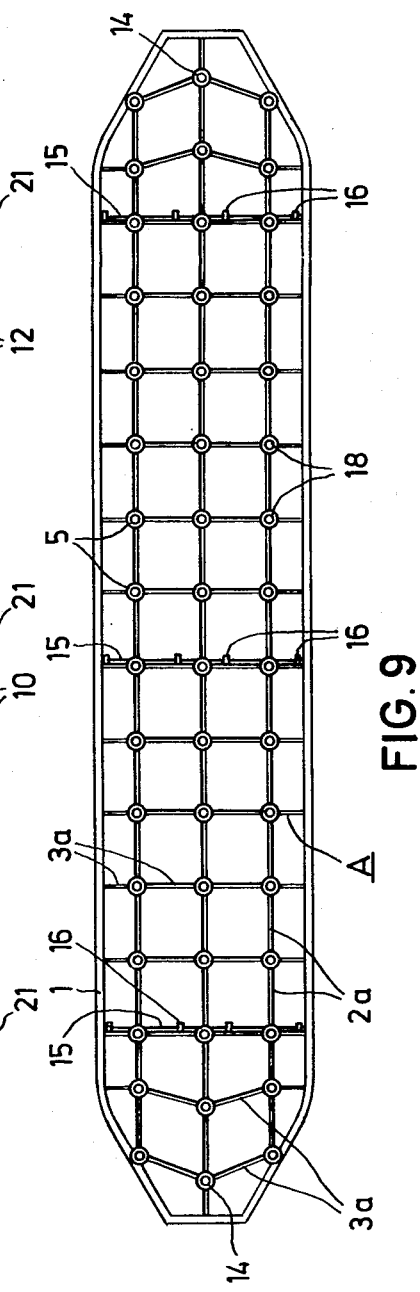

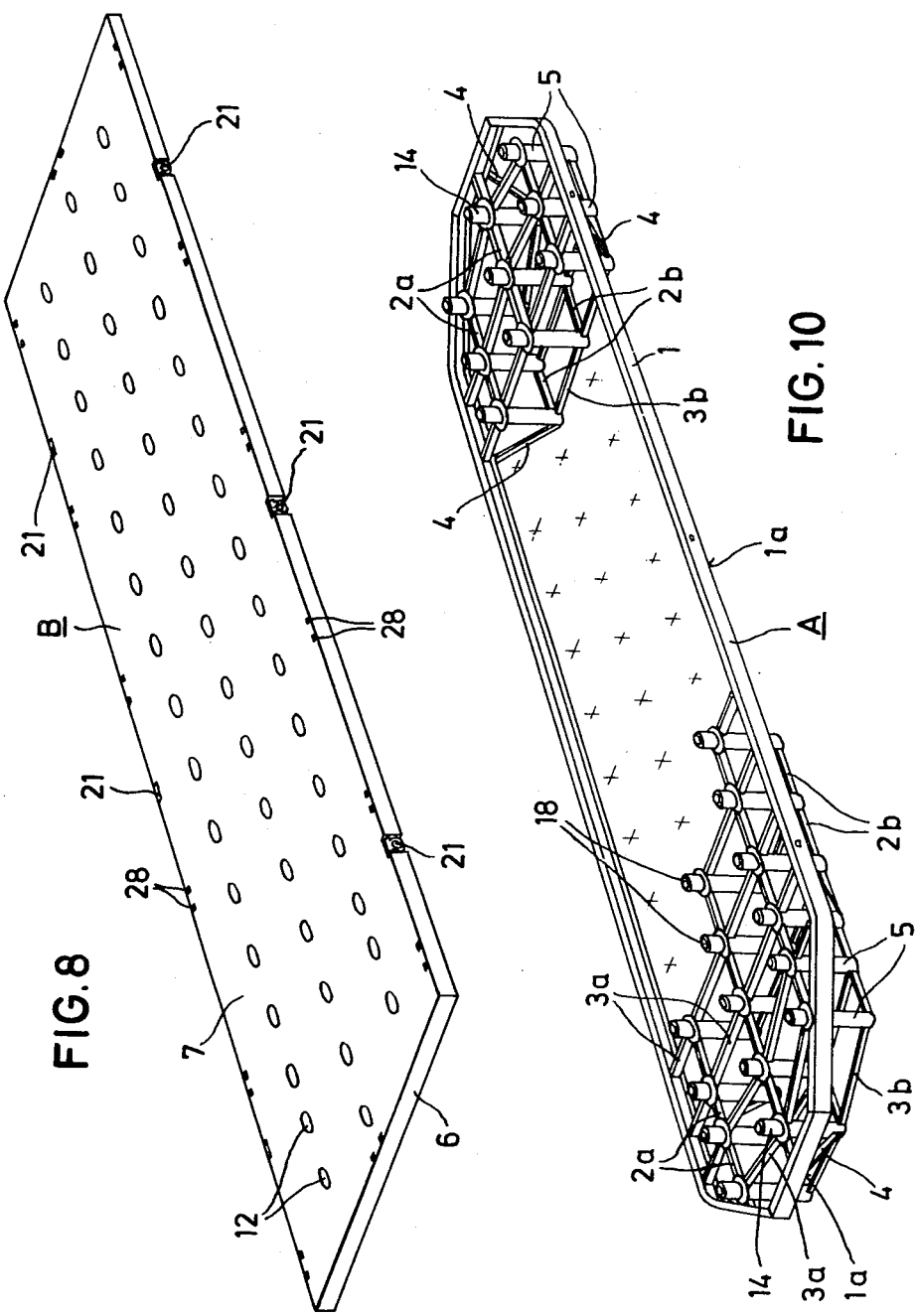

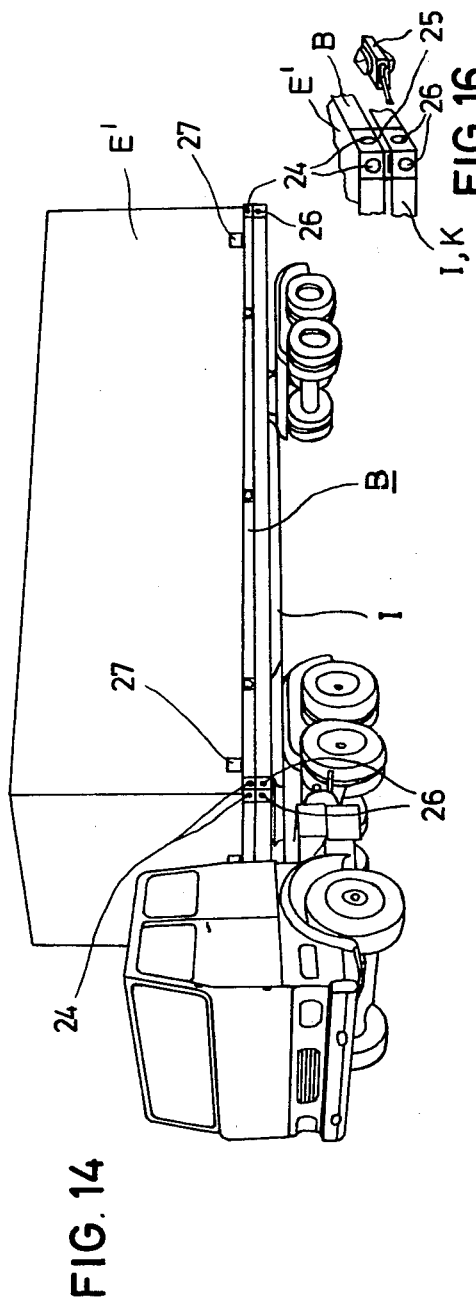
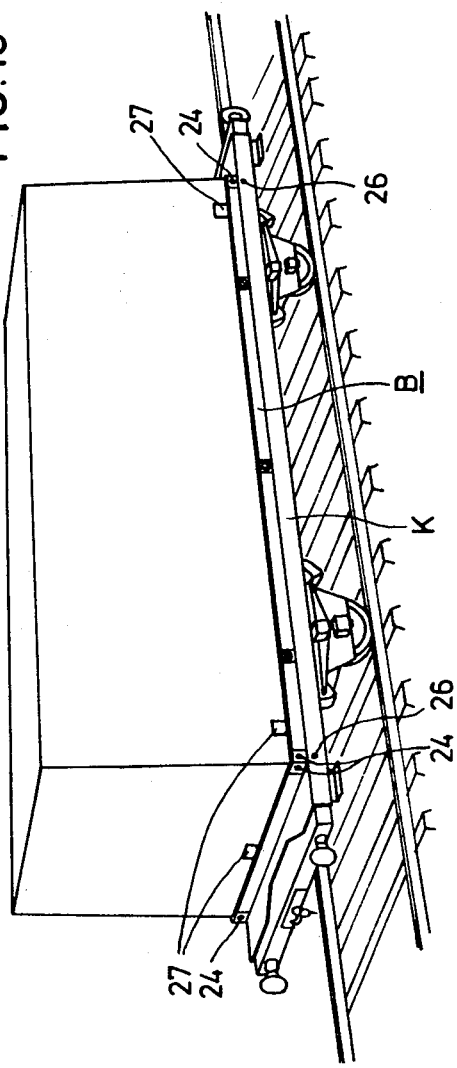

3,690,485

PORTABLE PLATFORMS, WITH ROLLER MEANS INSTALLED ON THEIR UPPER SIDE, FOR THE HANDLING AND TRANSPORTING OF FREIGHT

BACKGROUND OF THE INVENTION

The invention concerns portable platforms, equipped on their upper side with roller means, having a generally rectangular form, for the handling and/or transport of freight cargoes which are packed preferably on or in freight-carriers.

The transit traffic by means of standardized containers, so-called "transcontainers", has established itself extensively in regard to the combined freight transport on highways, railways, or water routes, whereby a great variety of special equipment has been developed which has proven itself in use as being most suitable for the handling of such transcontainers.

Even though these transcontainers were originally planned also for use in air transports, they could not establish themselves in this field because of their high dead weights. The transport of air freights is therefore generally accomplished by means of freight carriers of lighter weights, mainly by means of standardized palettes with or without protective covers (so-called "igloos"). These light-weight freight carriers, however, have, in contrast to transcontainers, only a very low self-sturdiness or rigidity, and for this reason must be underpinned near the bottom during transporting as well as during loading which, for example prohibits the use of loading cranes, or standard container-hoist equipment which was developed in connection with the common transcontainers. Gravity roller conveyors have proven themselves as being especially suitable for loading and unloading, and transporting means for the bottom underpinning of airfreight palettes, wherefore the loading decks of cargo planes, which are reserved for palette transports, the airport cargo facilities which are reserved for palette transports, and lately also vehicles, which serve the continued transport of airfreight palettes on ground, have been equipped with such gravity roller conveyor systems, thereby insuring an airfreight handling system which is somewhat flexible in utility and extensively automatable. Such gravity roller conveyor systems are, however, expensive not only in their manufacture but also in service maintenance, as breakdowns often occur, especially on account of their normally fixed mounting, and, especially in regard to later functional organizational changes or expansions, are extremely costly when changes are required, and thereby also time and cost consumptive. In addition, the commonly known gravity-roller conveyor systems are only able to move freight carrier means having a maximum length of up to approximately 3.05 meters. A combined coordinated and unified transit-traffic system equally adaptable to airways, railways, highways and waterways could, for these reasons, not be developed on a broad basis in view of the extensive utilization of such gravity-roller conveyor systems in air freight handling.

The impending utilization of fast supersize cargo planes means, however, that a combined container transit traffic on airways/railways/waterways/highways, more than ever before seems to be highly desirable, wherefore the traffic groups participating or interested in such a development have renewedly advanced the development of an airfreight container, which is suitable for such a combined transit traffic system, and have also already introduced a respective standardization program, which standardization is aimed towards an effective handling or transport of such special containers which are required for airfreight traffic, with the already known and standardized cranes and loading equipment (utilized, for example, on railway stations and in harbors).

The efforts made in this respect by the participating or interested transportation markets are among others contained in a report entitled "Rapid Container Handling Installations on Airports – Introduction for the Traffic with ISO-Containers" ("Container-Schnellumschlagsanlagen auf Flugplatzen – Einleiting zum Verkehr mit ISO-Containern"), which was published in the November 1968 issue of the "Container-Handbook" (Container Handbuch), or in the "Technical Informations – Krupp-Works Reports, Vol. 26, Hamburg, 1968," while the respective standardization efforts have been outlined in the standardization proposal "Aerospace Standard AS 832, Air-Land Demountable Cargo Containers," published by the Society of Automotive Engineers, Inc., New York, on Aug. 15, 1968. This standardization proposal is based on an airfreight container and has been accepted in professional literature under the term "Airfreight Container according to the ISO-Standard."

From page 2, left column, second paragraph, and right column, fourth mentioned article "Rapid Container Handling Installations on Airports," it can be noted that those types of the newly developed air cargo containers, according to the ISO-Standard, which are seen as perfect containers in the sense of transcontainers, still stand little or no chance to establish themselves in the air cargo transportation system, primarily since they have a dead weight which is too high.

A dead weight area unit suitable for air cargo containers is described as desirable in a publication by Lockheed Industrial Products, entitled "Air Freight Van Size Containers through 1975: A Study of Parameters," dated May 1968, which lists on page IV–3 in the last paragraph such an acceptable weight as 16.02 $kp/m^3$, wherein it was, however, pointed out at the same time that it is impossible with the known and presently developed container constructions and working material to fill this requirement. On page IV–4 of the same publication are listed estimated rates of major industries from which may be noted that, at this time, the actually attainable minimum dead-weight unit of volume for an air cargo container-type of the ISO-Norm, which can be compared with the common transcontainer, is to be estimated as in the range of about 28.15 $kp/m^3$ to 32.04 $kp/m^3$. Indeed, the major industries are offering such containers with measurements of 2.44 $m$ × 2.44 $m$ × 3.05 $m$ and with a dead-weight per unit volume of 32.2 $kp/m^3$. The lightest air cargo container, presently available on the market, and complying with the ISO-Norm, with identical dimensions, has a deadweight per unit of volume of 16.1 $kp/m^3$, it is, however, "nonintermodal" that is, it has neither the inherent rigidity necessary for cargo handling by means of cranes or for a stacking of several such containers, nor the corner bondings required for cargo handling by means of the common, and standardized for transcontainers, lifting apparati and loading devices, that is, these containers, in regard to the weight per unit of volume for air cargo traffic suitable ISO-container types, as well as the presently common airfreight palettes, must always be underpinned from below during the transport and during the moving of cargo and consequently again can only be handled and transported by means of the common expensive and inefficient gravity-roller conveyor systems.

In the article mentioned above, entitled "Rapid Container Handling Installations on Airports," it is accordingly shown, in the second paragraph of the left column of page 2, that only the latter mentioned, nonintermodal, that is, ISO-Container types which are tied to the cargo handling and transport by means of gravity-roller conveyor systems, are considered suitable for use in the near future on account of the aforementioned construction and raw material difficulties. For the reasons given above, these common gravity-roller conveyor systems are recommended in the article also for the future as the only cargo-handling or transport system to be considered seriously.

This would mean that also later on, the desired far-reaching transit traffic by means of air/rail/water/highway would not be realized due to the common difficulties, disregarding exceptional cases where, for certain reasons, very high airfreight rates are to be expected. For the reasons explained above, a transfer from the airway to the railway transport or to the water routes or highways, will be necessary then also in cases in the distant future where, in view of the high airfreight rates according to weight, the presently practiced and for many reasons inefficient reloading from airfreight rates according to weight, the presently practiced and for many reasons inefficient reloading from airfreight carriers to transcontainers or to other transportation means will be applied.

The above-mentioned article "Rapid Container Handling Installations on Airports" lists in the second paragraph of the right column on page 4 several proposals in connection with which are described platform vehicles under the term "Moving Palette," which have roller means on their upper supporting surface. These moving platforms are described as air-cushioned vehicles or guide-roller vehicles and should serve the handling of nonintermodal ISO-airfreight containers from the gravity-roller conveyor system, which is established in the freight airport, to the highway vehicles, the latter of which should also be equipped with a gravity-roller conveyor system. Also this proposal will bring no change from the expensive and cumbersome gravity-roller conveyor system and provides therefore no possibilities for the handling and transport of airfreight containers by means of the crane equipment and standardized loading devices which are common in the combined transcontainer system, or to enable the continued transportation of such transcontainers by ships.

SUMMARY OF THE INVENTION

The invention has as its object the solution of the problem of providing means for realizing a true, far-reaching general container handling system combination of air/railway/water/highway routes through the utilization of constructively simple and inexpensively produced technical means, with the presently commonly used airfreight platforms as well as with the lately offered nonintermodal airfreight containers corresponding to the ISO-Norm; whereby it will be possible to continue with the use, in air traffic, of the already existing expensive and awkward, hard-to-handle gravity-roller conveyor system, insofar as these would be able to handle cargo containers of the expected larger lengths without being dependent on same since generally to a great extent the common and presently in transcontainer traffic already use handling and transportation means, that is, especially cranes and standardized loading devices, so that it would not be necessary to equip railroad vehicles, ships and highway vehicles with expensive and complicated gravity-roller conveyor systems, which are prone to repeated breakdowns. The invention has also as its goal the accomplishing of speedily organized re-disposition in airfreight handling and the expansion of the freight handling systems in cargo airports, either with or without the utilization of already existing gravity-roller conveyor systems, without the need for changes on established fixed freight handling installations, or the need for new fixed constructions.

In the solution of this task, the invention includes a portable platform, equipped on its upper side with roller means, with a generally rectangular outline, for the handling or/and transport of goods, which are packed preferably on or in freight containers which, according to the invention, is characterized in that said platform is divided, along a generally horizontal separation area, into a portable lower section and a portable upper section which is detachably connected to the lower section.

In the continuous development of the invention, such a platform may also be divided along one or more separate areas, spaced generally vertically and disposed parallel to one or both base main axles, into a number of platform sections which are detachably connected to each other and which are adapted to the basic norm of the freights which will be handled or transported.

The roller means of the upper side of the platform may be located on the upper side of the upper sections of the platform, according to a preferred construction form of the inventive platform, or they may, according to a further embodiment of the inventive platform, be located on the lower sections of the platform and reach or extend through same after respective clearing of the upper sections of the platform.

According to the invention, the upper sections of the platform are equipped with means for attachment of hoisting equipment, lifting devices, such as, for example, rings, ropes, hooks, standardized container corner-mounting holes, recesses, or similar liftfork attachment areas. According to the invention, it is practical to equip the lower platform section with attachment means for hoisting devices, or lifting equipment, such as, for example, rings, ropes, recesses or forklift attachment areas. In the case of equipping the sections with forklift attachment areas, these will be located, according to a preferred embodiment of the invention, at the sides of the lower platform section in the form of generally horizontal lower areas of side-ways overlapping longitudinal areas of the respective lower platform section.

The connector means between the lower and upper platform sections are, according to the invention, preferably speedily detachable and can have the form, for example, of hook-type couplings or gripping lever couplings which are located either in or on the lower platform section or in or on the upper platform section.

In a further embodiment of the invention, it is effective that hoisting devices, such as lift-struts, pistons or rams, which are, for example, activated by mechanical or pressure means, either be mounted on or in the lower platform section or in or on the upper platform section, for the lifting of the upper platform section relative to the lower platform section.

The invention provides a very considerable technical advancement that, due to the utilization of the inventive platform, it will in the future become possible that the newly developed nonintermodal ISO-containers for air cargo can be utilized as a true transcontainer, since it will then become possible to handle the air-transported containers by themselves without the inventive upper platform section by means of the loading decks of cargo planes and in gravity-roller conveyor systems which are permanently installed at cargo airports, and to receive said container at any chosen point by means of the portable platform, equipped on its upper side with roller means, and to then transport the container, together with the inventive upper platform section, by means of conventional standardized cargo-handling and transportation means for the common transcontainer traffic, for example, to then transfer said container with cranes, transcontainer loading equipment or lift-loaders and other transport means, which themselves do not require being equipped with gravity-roller conveyor systems. This method will provide for a simple, speedy and inexpensive cargo transfer to other means of transportation, such as highway, railway, or water vehicles, without the need to equip these with gravity-roller conveyor systems. Should the container then again be transferred by air, it can then again be placed with conventional cargo-handling means together with the inventive upper platform section, which underpins said container from below, onto an already waiting inventive lower platform section in order to be then transferred by itself through the gravity-roller conveyor system of the inventive platform to the gravity-roller conveyor system of the cargo airport or the receiving loading deck of the respective cargo plane.

Since the inventive platform, according to one embodiment of the invention, is portable by means of special lift-loaders, or, according to another embodiment of the invention is designed as a pulled or self-driven vehicle, it is possible, without difficulties, to install the inventive platform on all points of the cargo airport where such a cargo container acceptance or transfer or interim storage of cargo containers is necessary. Through a lining up of many of the inventive platforms, it will also be possible to assemble entire gravity-roller conveyor systems according to needs and thus to change or expand the cargo handling possibilities on a cargo airport according to needs.

The utilization of the inventive platform is naturally not limited to the handling and the transport of the newly developed nonintermodal aircargo containers, but is applicable to all nonintermodal freight carriers, or non-intermodal cargo, such as, for example, also to the presently common airfreight palettes.

Of special advantage is that type of embodiment of the inventive platform in which the roller means of the upper platform are mounted on the lower platform section and extend through said lower platform section when the upper platform section is removed. This embodiment of the inventive platform provides not only for a very light weight of the upper platform section but also has the further advantage that, at the moment in which the upper section of the platform is being lifted off the lower platform section, an automatic securing of the freight carrier on the upper section of the platform against sliding results therefrom.

Due to the above explained constructive and functional advantages, the inventive platform enables a truly extensive combination of air/rail/waterway/highway system for which efforts were made already some time ago with the establishing of transcontainers, which, however, due to the high dead weight area unit of the transcontainers could indeed not be realized even with the comparable type of newly developed ISO-Containers.

The surplus weight of the upper section of the platform and its unimportant larger space requirement which will have to be expected during transport by railroad, water routes or highways in utilizing the inventive platform may in general by kept within economically acceptable limits through their lightweight construction and the use of suitable raw materials, so that the advantages resulting from the invention compared to the presently common or presently proposed handling and transportation means, are generally not much influenced by the surplus weight.

The invention is described in detail hereinbelow, with respect to one embodiment thereof, under reference to the hereto attached drawings, in which:

BRIEF DESCRIPTION OF THE DRAWINGS

FIG. 1 represents a schematic side view of an embodiment of the inventive platform;

FIG. 2 represents a schematic top view of the inventive platform as shown in FIG. 1;

FIG. 3 represents a schematic perspective view of the inventive platform as shown in FIGS. 1 and 2;

FIG. 4 shows a transverse sectional view along the line IV—IV of FIG. 1;

FIG. 5 shows a transverse sectional view along the line V—V of FIG. 1;

FIG. 6 represents a partially cut-out detail from FIG. 4, on an enlarged scale;

FIG. 7 shows a schematic top view of the upper section of the inventive platform;

FIG. 8 represents a schematic perspective view of this upper section;

FIG. 9 represents a schematic top view of the lower section of the inventive platform;

FIG. 10 shows a schematic perspective representation of the lower section, with portions removed for clarity;

FIG. 12 represents a schematic perspective view illustrating the disassembling of a stack formed by the inventive platforms;

FIG. 14 represents a schematic perspective side view illustrating the utilization of the upper section of the inventive platform during the transport of an ISO-airfreight container by means of a light weight roadway vehicle;

FIG. 15 shows a schematic perspective view illustrating the utilization of the upper section of the inventive platform during the transport of an ISO-airfreight container by means of a railway flatcar; and FIG. 16 is an enlarged view showing details of a portion of FIGS. 14 and 15.

DETAILED DESCRIPTION OF THE INVENTION

Figure 11:
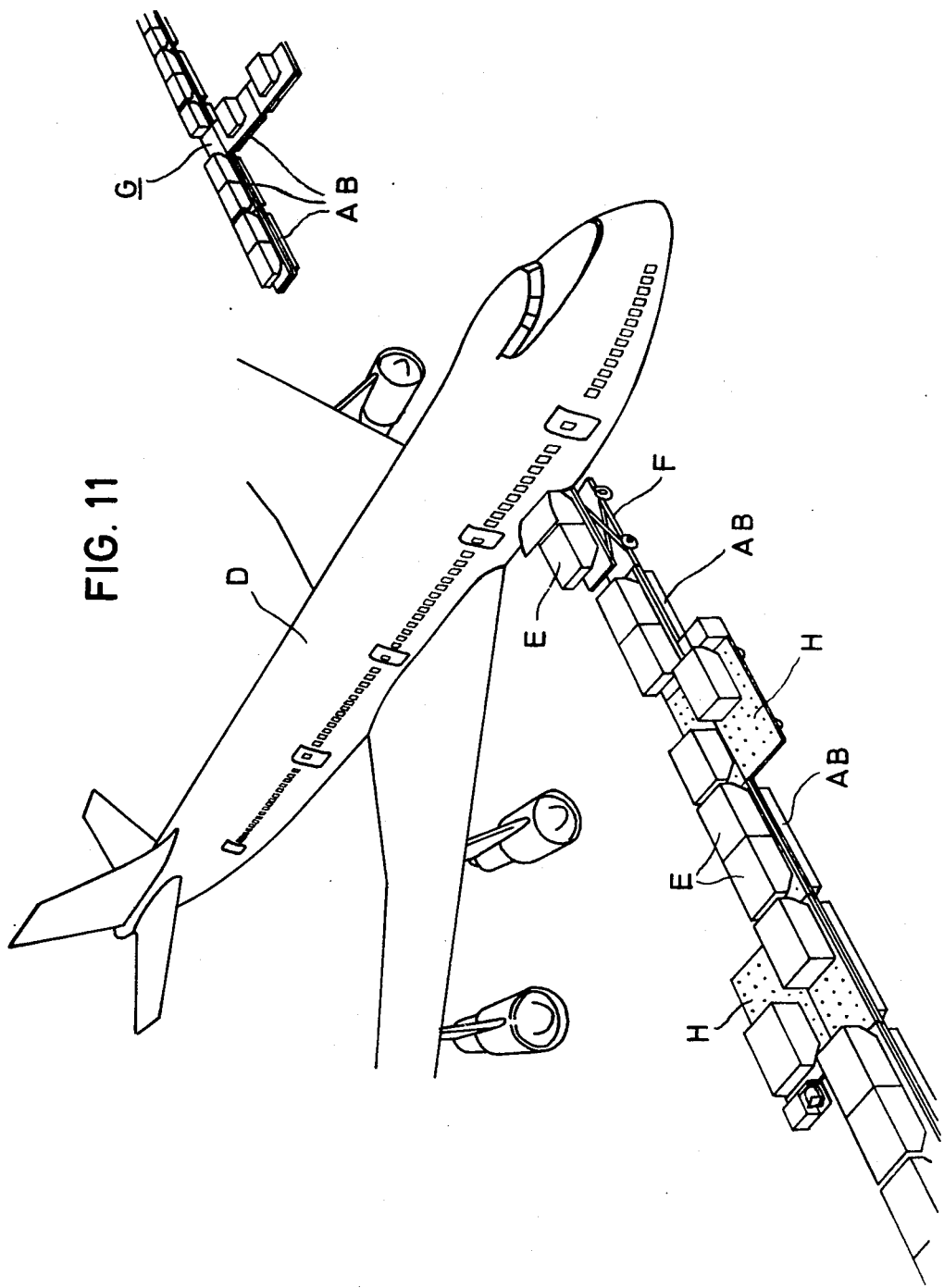
FIG. 11 shows a schematic perspective representation, illustrating the application of the inventive platform during the unloading of a large cargo plane.

The inventive platform, as represented in the drawings, consists basically of a lower platform section A and an upper platform section B. Lower section A and upper section B are separable from each other, according to the invention, along one, generally horizontally placed, separation area or zone.

The lower platform section A has, as can be seen especially from FIGS. 1, 3, 4, 5, 6, 9 and 10, the form of a fixed supporting body which is formed in general by a frame 1, having upper longitudinal struts 2a and upper cross struts 3a, as well as lower cross struts 3b and finally slanting struts 4, whereby the latter connect the outer junctions of lower longitudinal struts 2b and the lower cross struts 3b with the upper longitudinal struts 2a and the upper cross struts 3a at points close to the frame 1. The junctions of the upper longitudinal struts 2a and the upper cross struts 3a are connected through vertical connector tubes 5 with the junctions of the lower longitudinal struts 2b and the lower cross struts 3b, with said lower longitudinal struts 2b and lower cross struts 3b being basically assigned to the upper longitudinal struts 2a and the upper cross struts 3a, whereby the connector tubes 5, as is seen especially in FIGS. 4, 5, 6 and 10, project upwardly a certain distance above the level of frame 1 and the upper longitudinal struts 2a or the upper cross struts 3a, respectively. The lower platform section A may be formed as a single integral piece in welding construction, and its individual building elements can consist either of steel or of a suitable light weight metal.

As may be seen especially from FIGS. 4, 5 and 10, the upper ends of the slanting cross struts 4 are attached to the assigned points of the upper longitudinal struts 2a or upper cross struts 3a, respectively, in such a manner that downward pointed working surfaces 1a are formed by the protruding lower edge of frame 1 at the longitudinal sides of the lower platform section A as well as at its front; said working surfaces in cooperation with the lifting fork of a lift-loader vehicle, which is not an object of the instant invention, can be brought into with cooperation, the latter serving for the transport of the inventive platform to any chosen place at which it is to be utilized. Such a lift-loader vehicle is exemplified in FIG. 12 and is identified by the letter C.

In an alternate construction thereof, according to the invention, the lower platform section A, in a way not shown, may be equipped with a blockable, and selectively desirable, driving gear, or may be constructed as an air cushion vehicle. The lower platform section A, if so desired, may be equipped with boltable anchoring means (not shown) for securing the platform to the ground for stabilization. Also, means such as, for example, screw-spindle gears (not shown) for levelling off of the effective platform level may be installed on the lower platform section.

As can be noted especially from FIGS. 2, 9 and 10, the frame 1 of the lower platform part A is preferably shaped in a ship-bow fashion at both ends, i.e., pointed or tapered. This has the advantage that forklift vehicles, which are not part of the invention, and which are not shown in the drawings, may be used for transporting the lower platform section A, which has, at its end, long unloading forklifts attached, reaching at the two longitudinal sides of the lower platform section beneath frame 1 to come into communication with the forklift working surfaces 1a. The pointed or tapered ends of the frame assist the forklifts of these special vehicles to guide and receive the lower platform section A between the fork prongs.

The lower platform section A can in addition be equipped with working means (not shown) for lift devices, for example, with rings, ropes, hooks, recesses or similar means, which enable the lifting off of the lower platform section by a conventional crane in the usual manner.

As already mentioned above, the lower platform section A can be constructed as a vehicle or part thereof in a manner not shown. This can be accomplished also in the form whereby the lower platform section A is equipped with a retractable driving gear or with retractable guide rollers. In the case where the lower platform section A is constructed as a vehicle without a self-contained motor, it can be equipped at its ends with vehicle couplings, by means of which it may be coupled, for example, to locomotives or to other similarly constructed lower platform sections.

The upper platform section B, as may be seen especially from FIGS. 1-5, 7 and 8, has the form of a fixed supporting body which is preferably constructed as a box structure with its inside being reinforced. This box structure consists generally of a frame 6, having protective tin cover members 7 and 8, and inner reinforcing longitudinal ribs 9 and reinforcing cross ribs 10. The junction points of these longitudinal reinforcing ribs 9 and the reinforcing cross ribs 10 are formed by tube sections 11 which intersperse the box construction in the vertical direction and end in respective circular clearances 12 of the cover member 7 or the bottom member 8.

Also, the upper platform section B is preferable of a welded construction and consists predominantly of light weight metal elements in order to obtain the lowest possible dead weight area unit.

The center axis of each of the tube sections 11 is basically aligned with the center axis of each of the respective tubes 5 and the diameter of the tube sections 11 is chosen in a size as to accommodate the easy insertion of the tubes 5 which extend upwardly above the level of the top of the frame 1. Supporting rings 13 are attached to the tubes 5 at the height of the upper edge of frame 1, with said supporting rings having an outer diameter large enough for the bottom member 8 of the upper platform section B to be placed onto these supporting rings, thus providing a solid support for the upper platform section B upon the lower platform section A.

As can be noted especially from FIGS. 5, 9 and 10, some of the extending ends of the tubes 5 are equipped with centering collars 14 which are conically shaped at the top, and which insure that during the setting down of the upper platform section B onto the lower platform section A, all extending ends of the tubes 5 of the lower platform section A are safely inserted into the clearances 12 of the bottom member 8 of the upper platform section B and are therewith also securely inserted into the tube sections 11 of the upper platform section B.

As seen especially from FIGS. 4 and 9, crosswise hook-bolt bars 15 are placed at some points in the area of the frame 1, in the upper cross struts 3a of the lower platform section A, with said hook-bolt bars having hook-members 16 which cooperate with properly placed recesses of the bottom member 8 of the upper platform section B in such a manner that they connect in a holding position the upper platform section B fixedly and immovably with respect to the lower platform section A. The activating of the hook-bolt bars 15 is made by means of removable activating cranks 17 of which one is shown in FIG. 4. The hook-bolt bars 15 can be also placed, in another embodiment, in the upper platform section B; however, their placing into the lower platform section A in view of the resulting reduced weight is preferred to the placing of same in the upper platform section B.

As may be seen especially from FIGS. 2, 3, 4, 5, 6, 9 and 10, ball rollers 18 are placed into the upper ends of the tubes 5 of the lower platform section A, with said ball rollers serving as a glide base for the freight carrier which is to be pushed onto the platform. Such ball rollers are already known to serve purposes as mentioned above. The ball rollers 18 are placed into holding and ball bearing cages 19, with the latter being placed at the upper ends of the tubes 5 of the lower platform section A, into bearing caps 20, in such a manner that they extend about 1 centimeter above the base of the cover member 7 of the upper platform section B when the upper platform section B is resting on the lower platform section A. This has as a result that the freight carrier to be handled can be pushed onto the upper platform section B in an easy and efficient fashion, while the upper platform section B rests on the lower platform section A; and while at the moment during which the upper platform section B, relative to the lower platform section A is being lifted off by more than one centimeter, i.e., so that the ball-rollers no longer extend above the upper platform section, the respective freight carrier will then rest securely on the cover tin 7 of the upper platform section B.

In place of the ball-rollers 18, other roller means may be used such as, for example, powered and/or non-powered cylinder-rollers or guide-rollers which may be rotatable around vertical swivel-axles. In a different embodiment of the invention, the roller means, instead of being placed in the upper ends of the tubes 5 of the lower platform section A, may also be placed in the upper platform section B; however, the here-described type of positioning of the roller means, as represented in the drawings, is preferred for one reason, in view of the desired reduced weight of the upper platform section B and for another reason in view of the here-described self-locking of the freight carrier, which has been received on the upper platform section B, during the removing of the freight carrier from the lower platform section A.

In order to enable such a self-locking of the freight carrier when placed on the upper platform section B, without the need for removing the upper platform section B from the lower platform section A, the bearings of the respective roller means may be placed in the upper ends of the tubes 5 of the lower platform part A in a downwardly movable fashion in a different embodiment of the invention (not shown), whereby this shifting, for example, can be made by camshafts which transgress these tubes cross-ways, or by longitudinally movable cam members, or by hydraulic means.

As can be seen especially from FIGS. 1, 2, 3, 7 and 8, the upper platform section B is equipped along both sides with rings 21 secured thereto which enable the attaching of a loading device and thereby permit the lifting off of the upper platform section B, either with or without the freight container resting on said platform, by means of a crane. In place of, or in addition to, the rings 21, standardized container corner mounting loops, in a manner shown, for example, in FIGS. 14 through 16, or forklift grip areas (not shown), may be arranged on the upper platform section B, which will permit lifting the upper platform section B off the lower platform section A, for example with standardized container loading equipment or by means of a lift-loader.

Lifting means may be arranged either on the lower platform section A or on the upper platform section B (not shown) which allows the lifting off of the upper platform section B to a limited degree from the lower platform section A. This is then of an advantage when, for example, it is necessary that the roller means positioned on the lower platform section A prevent the freight carrier from sliding on the upper platform section B, when the upper platform section B is slightly lifted off, relative to the lower platform section A, or if the prongs of the forklift should be pushed in between the only slightly lifted upper platform section B and the lower platform section A, in order to remove the upper platform section B completely from the lower platform section A. Such means for a slight lifting of the upper platform section B relative to the lower platform section A may, for example, have the form of lifting strust, etc. which are activated by lifting cogs, or by screw gear or hydraulic lifting means.

By referring now to FIGS. 11 through 15, the utilization of the inventive platform for the moving or transport of airfreight containers will be described hereinbelow in abbreviated form.

FIG. 11 shows a large plane D having landed at an airport, and from the cargo space of said plane are being unloaded so-called belly containers E. As seen, a portable loading bridge F, having an upwardly and downwardly movable loading ramp on which are arranged powered roller conveyors, has been moved to the loading door of the plane D; whereby said loading bridge timely accepts the affixed containers E which are pushed out by preferably powered gravity conveyor rollers; and where said portable loading bridge lowers the containers to the means for the continuing transport thereof. This means for continuing transport is formed by the inventive platforms A and B which have been lined up to the discharge side of the loading bridge F and form thus a connected means of continuing transport for the containers E. The inventive platforms A and B can be moved in the manner shown in FIG. 12, in which may be seen, for example, that a common lift-loader C removes always the uppermost platforms AB from a stack formed of said platforms and delivers these to the place of utilization. The platforms AB, which have been lifted from the stack by lift-loader C, can be moved to the place of utilization, in case where the transport-way is extensive, preferably also by means of a special transport vehicle with a frontal forklift, as mentioned briefly hereinabove. Through the respective frontal pushing together of a number of platforms AB, transport roads of any suitable or desired length may be formed which are adaptable from case to case to the individual prevailing loading/unloading conditions, as shown in G of FIG. 11 for example, where a basically T-shaped freight-handling system is indicated. Should there exist a need fro the removal of individual containers from the formed unloading road for their reloading to other planes, for instance, then there are utilized respective bridge vehicles H which drive to the unloading road and take the containers from the line of unloaded containers and move same, for example, to the waiting road G.

Figure 13:
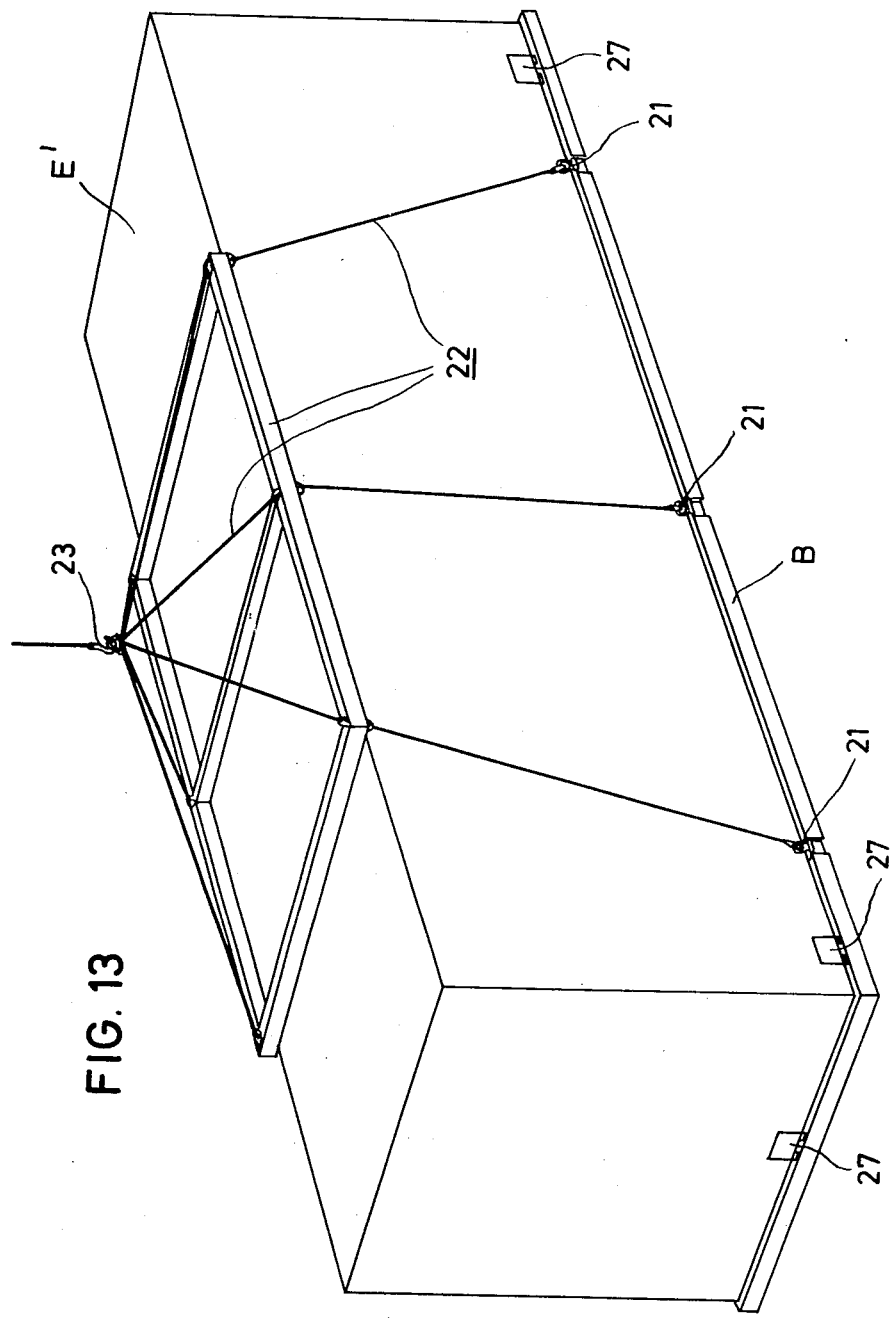
FIG. 13 shows a schematic perspective view illustrating the utilization of the inventive platform during the moving by crane of an ISO-airfreight container.

Should the unloaded containers E be transported then from the airport to another location by means of highway vehicles, for example, then a conventional container loading device 22 is attached into the rings 21 of the upper platform section B of the platforms AB, which device holds the respective container in the manner shown in FIG. 13; whereby said container loading device 22 can be attached to a hook 23 of a regular crane in the common manner. The upper platform section B, together with the container resting on said upper platform section, can then be lifted off from the lower platform section a after unhooking of the hook shaft assembles 15, 16, and, for instance, as in the manner shown in FIG. 14, be placed on a highway vehicle I which then takes over the continued transport. While FIG. 11 depicts the unloading/loading of a so-called "belly container" E, FIGS. 13, 14 and 15 represent the handling of ISO-Containers E'.

As already mentioned above, the upper platform section B may be equipped with standardized container corner mounted recesses. These corner mounted recesses, as described in FIGS. 14, 15 and 16 with reference number 24, may serve, for example, to connect and secure the upper platform section B with the standardized container pivot connectors 25, to the loading deck of the highway vehicle I, whereby said loading deck should also be equipped with such standardized corner mounted recesses 26 in the common manner.

As FIG. 15 shows, the continued transport of the container which has been lifted from the lower platform section A together with the upper platform section B can be taken over also by means of a railroad car K instead of a highway vehicle I in the same manner.

The moving of containers E or E' resting on the upper platform section B in seaports is handled accordingly in the same manner as described above under reference to FIG. 13.

According to an additional embodiment of the invention, the upper platform section B is equipped with the standardized container corner mounted recesses, and has the standardized basic container dimensions. This makes it possible, for example, in the loading of containers in the hold of container ships, to stack up several transcontainers and to place on the top an airfreight container which rests on one inventive upper platform section B, for instance an ISO-Container, or an airfreight palette, whereby, in addition to the common mutual anchoring of the stacked transcontainers, also the upper platform section B can be secured to the uppermost transcontainer in the common manner by means of standardized container pivot connectors 25.

As may be seen from the above representation, it is of no importance that the containers, which have to be transferred, have the inherent rigidity which had previously been required for handling by crane. The necessary underpinning of the bottom area of the containers is always made by means of accompanying upper platform section B which is so light in weight and space-saving due to its construction and the choice of raw material used in its construction parts, that it has an insignificant weight in relation to the container in transport.

As can be noted from FIGS. 3, 8, 13, 14 and 15, the upper platform section B may be equipped with means for securing the freight resting on it, with such safety means in the case of airfreight containers or airfreight palettes preferably having the form of holding clips 27, having plug pivots which are inserted into the openings 28 of the upper platform section. Means may also be movably attached to the openings 28 for the purpose of accepting piece or bulk goods on the upper platform section B, such means consisting of clamps or suitable enclosures such as stanchion chains, enclosure walls or cages.

According to an embodiment of the invention, which is not described here, the inventive platform can be divided along one or more separate areas, which move in main axes general vertically parallel to one or to both bases, into several platform sections, which are detachably connected to each other and which are being adapted to the basic standard of the freights or freight carriers to be moved or transported. In this case, centering means are assigned at or near these separation areas at the respective sides of the lower platform section, said centering means cooperating each with respective cooperating elements of the respective bordering lower platform section, for instance, with horizontally extending conical centering spigots which cooperate with respective clearances of the individual counter partitions. The connection between the individual lower platform sections is again made suitable with speedily disconnectable connector means, for example, also with hook-bolt type couplings or bolt-lever couplings which guarantee a safe and thereby still rapidly disengageable mutual connection.

It is thereby considered effective to provide for mechanically activated or pressure means activated push-off struts, rams for separating the respective lower platform section after releasing the connector means which hold these lower platform sections together, whereby such push-off struts are mounted at or near the divider areas which separate the lower platform section from each other at the respective side dividers of these lower platform sections.

Even though the inventive platforms are primarily intended for use in connection with freight containers having little or no inherent rigidity, to be lifted, for example, by means of a crane of a lift-loader, and particularly for utilization in connection with airfreight containers and airfreight palettes, its application is of advantage not only in connection with such light-weight freight carriers. It is suitable, of course, also for the handling of heavy transcontainers and offers also here important advantages through the possibility to establish a random number of transport and handling roads at freight handling points.

What is claimed is:

1. A platform for the handling and transporting of load carrying units not capable to be handled by cranes, and particularly for the handling of non-intermodal containers, with the platform having an upper surface and roller means attached to the upper surface, and being adapted to be used as a part of a roller-conveyor, the platform comprising a lower section, an upper section supported by the lower section, said lower section having a plurality of vertical support members attached thereto and projected upward therefrom through corresponding apertures of the upper section for temporarily supporting the load to be handled, the improvement being that said lower section and upper section are each separately transportable units, at least said upper section conforming in size to transshipping container standards and being provided with attachment means conforming in size and location to standardized container corner fittings, said roller means being attached to the uppermost ends of said vertical support members and adapted to support load carrying units whenever the upper section rests on the lower section, and disengagable coupling means for providing temporary connection of said lower section with said upper section.

2. The platform as claimed in claim 1, in which said lower section is constituted by a lattice structure comprising a plurality of upper and lower generally horizontal frame members and a plurality of generally vertical members connecting said upper and lower frame members.

3. The platform as claimed in claim 2, in which said vertical members of said lattice structure connect lower and upper junction points of said lattice structure and serve as the vertical support members carrying the roller means.

4. The platform as claimed in claim 1, in which the roller means are constituted by supporting balls, and said balls being carried in respective bearings attached to the uppermost ends of said vertical support members of said lower section.

5. The platform as claimed in claim 1 in which the uppermost ends of said vertical support means carrying said roller means of the lower section are provided with frustoconical collars serving as centering means with regard to said upper section.

6. The platform as claimed in claim 1 in which the lower section is provided with attachment means for enabling a lifting device to lift such section.

7. The platform as claimed in claim 6, in which the lower section is provided with fork-lift attaching areas, said fork-lift attaching areas being defined by a plurality of overhanging portions at the periphery of said lower section, each of said overhanging portions having a generally horizontal lower surface.

8. The platform as claimed in claim 6, in which the lower section, as seen in a vertical projection into a horizontal plane, is pointed or tapered at its opposite ends, and at least one of said forklift attaching areas being located adjacent each of said pointed or tapered ends.

9. The platform as claimed in claim 1, in which said upper section comprises a rigid self-supporting box construction.

10. The platform as claimed in claim 1 in which said attachment means of said upper section are adapted to be engaged by a lifting device, whereby said upper section may be hoisted by the lifting device and removed from said lower section.

11. The platform as claimed in claim 1, in which said attachment means of said upper section are adapted to receive standardized container pivot-connectors selectively connecting said upper section either with a container being located underneath said upper section, or with a loading area of a container-transporting-means carrying said upper section, or with a load carrying unit being located on the upper surface of said upper section.

12. The platform as claimed in claim 1, in which the upper section is provided with means for releasably securing bulk freight.

13. The platform as claimed in claim 1, in which said disengagable coupling means for temporary connection of said lower section with said upper section are constituted by hook-bolt bars rotatably arranged near the upper surface of said lower section and cooperating with respective recesses arranged at the lower surface of the upper section.

* * * * *